United States Patent
Granz et al.

(10) Patent No.: US 9,940,959 B1
(45) Date of Patent: Apr. 10, 2018

(54) NON-CONTACT LASER-INDUCED PROTRUSION MEASUREMENT APPARATUS AND METHOD

(71) Applicant: Seagate Technology LLC, Cupertino, CA (US)

(72) Inventors: Steven Douglas Granz, Shakopee, MN (US); Michael Thomas Johnson, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/615,399

(22) Filed: Jun. 6, 2017

Related U.S. Application Data

(63) Continuation of application No. 14/964,870, filed on Dec. 10, 2015, now Pat. No. 9,685,182.

(51) Int. Cl.
| | |
|---|---|
| *G11B 11/00* | (2006.01) |
| *G11B 5/60* | (2006.01) |
| *G11B 5/00* | (2006.01) |
| *G11B 7/1263* | (2012.01) |
| *G11B 11/105* | (2006.01) |
| *G11B 7/126* | (2012.01) |

(52) U.S. Cl.
CPC .......... *G11B 5/6052* (2013.01); *G11B 5/6082* (2013.01); *G11B 5/6088* (2013.01); *G11B 7/126* (2013.01); *G11B 7/1263* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,995,425 B2 | 8/2011 | Schreck et al. | |
| 8,077,418 B1 | 12/2011 | Hu et al. | |
| 8,456,643 B2 | 6/2013 | Prabhakaran et al. | |
| 8,456,980 B1 | 6/2013 | Thayamballi | |
| 8,576,671 B1 | 11/2013 | Cha et al. | |
| 8,593,915 B2 | 11/2013 | Schreck et al. | |
| 8,837,071 B2 | 9/2014 | Macken et al. | |
| 8,873,353 B1 | 10/2014 | Riddering | |
| 8,897,104 B1 | 11/2014 | Yan et al. | |
| 8,908,483 B1 | 12/2014 | Ren et al. | |
| 9,030,773 B2 | 5/2015 | Macken et al. | |
| 9,208,811 B1 * | 12/2015 | Kim ...................... | G11B 5/607 369/13.33 |

(Continued)

OTHER PUBLICATIONS

U.S. Appl. No. 14/964,870, filed Dec. 10, 2015, Granz et al.

*Primary Examiner* — Tan X Dinh
(74) *Attorney, Agent, or Firm* — Hollingsworth Davis, LLC

(57) ABSTRACT

A method and apparatus are directed to providing relative movement between a slider configured for heat-assisted magnetic recording and a magnetic recording medium, and causing protrusion of a portion of an air bearing surface (ABS) of the slider in response to activating at least a laser source while maintaining spacing between the protrusion and the medium. A magnitude of at least a portion of the protrusion is measured while maintaining spacing between the protrusion and the medium.

20 Claims, 11 Drawing Sheets

(56) References Cited

U.S. PATENT DOCUMENTS

| | | | |
|---|---|---|---|
| 9,685,182 B1* | 6/2017 | Granz | G11B 5/6052 |
| | | | 369/13.33 |
| 2009/0251828 A1 | 10/2009 | Schreck et al. | |
| 2011/0286129 A1 | 11/2011 | Prabhararan et al. | |
| 2012/0147716 A1 | 6/2012 | Hara et al. | |
| 2013/0044575 A1* | 2/2013 | Mori | G11B 5/3133 |
| | | | 369/13.26 |
| 2013/0286802 A1* | 10/2013 | Kiely | G11B 13/04 |
| | | | 369/13.33 |
| 2013/0286805 A1* | 10/2013 | Macken | G11B 5/314 |
| | | | 369/13.33 |
| 2014/0177090 A1 | 6/2014 | Contreras et al. | |
| 2014/0269819 A1 | 9/2014 | Kiely et al. | |

* cited by examiner

NON-CONTACT LASER-INDUCED PROTRUSION MEASUREMENT APPARATUS AND METHOD

RELATED PATENT DOCUMENTS

This application is a continuation of U.S. Ser. No. 14/964,870, filed Dec. 10, 2015, which is hereby incorporated herein by reference in its entirety.

SUMMARY

Embodiments of the disclosure are directed to a method comprising providing relative movement between a slider configured for heat-assisted magnetic recording and a magnetic recording medium, and causing protrusion of a portion of an air bearing surface (ABS) of the slider in response to activating at least a laser source while maintaining spacing between the protrusion and the medium. The method comprises measuring a magnitude of at least a portion of the protrusion while maintaining spacing between the protrusion and the medium.

Some embodiments are directed to a method comprising providing relative movement between a magnetic recording medium and a slider configured for heat-assisted magnetic recording, the slider comprising an air bearing surface (ABS) and a thermal sensor at or near the ABS. The method comprises, in the absence of laser excitation, determining a first resistance response of the thermal sensor to varying clearance while maintaining spacing between the slider and the medium. The method also comprises, in the presence of laser excitation, determining a second resistance response of the thermal sensor to varying clearance while maintaining spacing between the slider and the medium, wherein the laser excitation causes protrusion of a portion of the ABS. The method further comprises measuring a magnitude of at least a portion of the protrusion using the first and second resistance responses.

Other embodiments are directed to an apparatus comprising a slider configured for heat-assisted magnetic recording, with one or more thermal sensors at or near an air bearing surface (ABS) of the slider. Excitation of a laser source causes protrusion of a portion of the ABS extending toward, but spaced apart from, a magnetic recording medium. A processor is coupled to the one or more thermal sensors and configured to measure, while maintaining spacing between the protrusion and the medium, a magnitude of at least a portion of the protrusion using the one or more thermal sensors.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Figure 1:
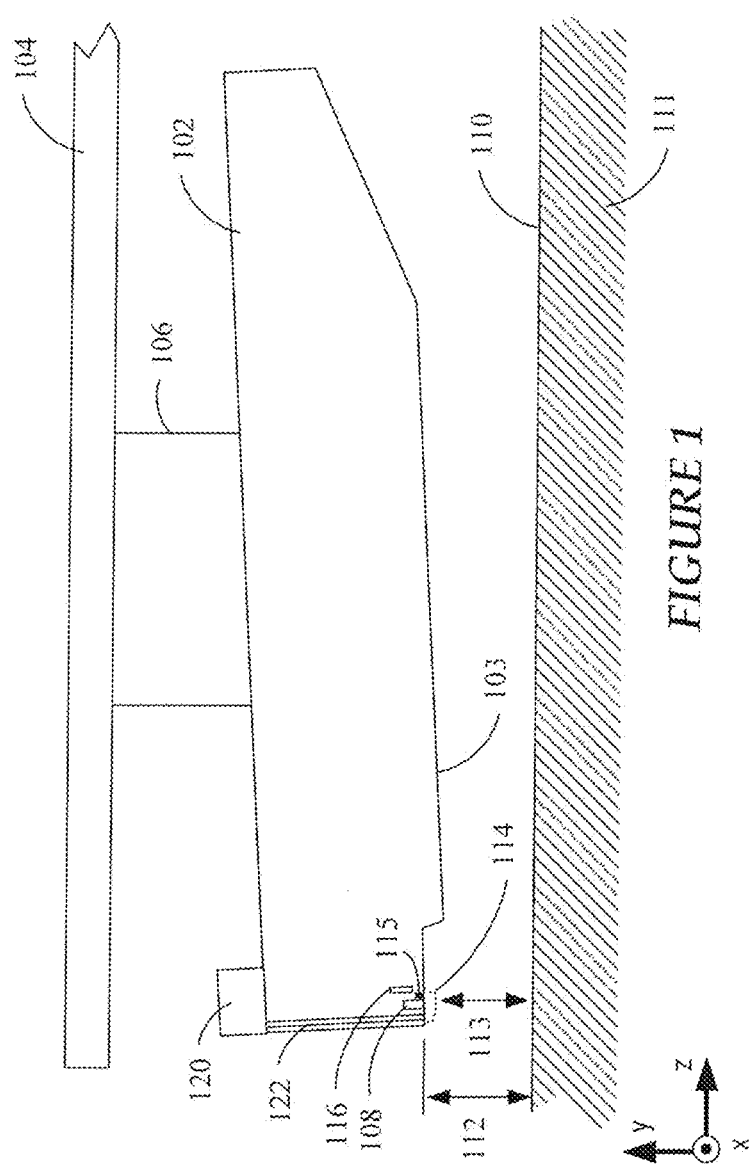
FIG. 1 is a side view of a slider configured for heat-assisted magnetic recording (HAMR) with which embodiments of the present disclosure can be implemented.

Referring now to FIG. 1, a block diagram shows a side view of a slider 102 according to a representative embodiment. The slider 102 may be used in a magnetic data storage device, e.g., a hard disk drive. The slider 102 may also be referred to as a recording head or a read/write head, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 shown in FIG. 1 is configured as a HAMR recording head, which includes a laser 120 (or other energy source) and a waveguide 122. The waveguide 122 delivers light from the laser 120 to components (e.g., a near-field transducer) near the read/write transducers 108.

When the slider 102 is located over a surface 110 of a recording medium 111, a flying height 112 is maintained between the slider 102 and the surface 110 by a downward force of arm 104. This downward force is counterbalanced by an air cushion that exists between the surface 110 and an air bearing surface 103 (also referred to as a "media-facing surface") of the slider 102 when the recording medium 111 is rotating. It is desirable to maintain a predetermined slider flying height 112 over a range of disk rotational speeds during both reading and writing operations to ensure consistent performance.

Region 114 is a "close point" of the slider 102, which is generally understood to be the closest spacing between the read/write transducers 108 and the magnetic recording medium 111, and generally defines the head-to-medium spacing 113. To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A thermal sensor 115 is shown situated at or near the close point 114 (e.g., adjacent the read/write transducers 108, such as near the near-field transducer) or can be positioned at other locations of the ABS 103 where protrusion of the ABS 103 is to be measured.

Figure 2:
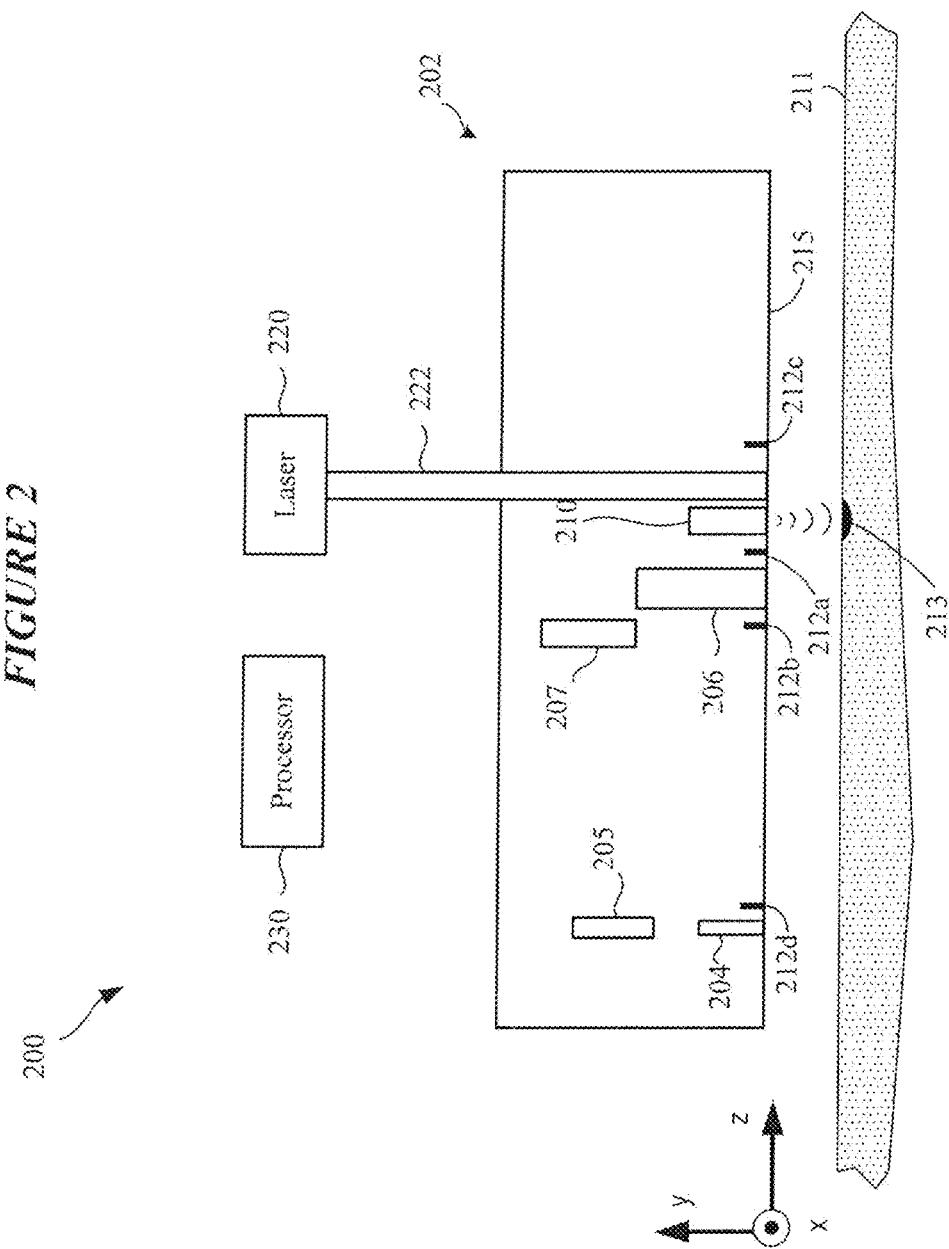
FIG. 2 is a perspective view of a slider configured for heat-assisted magnetic recording (HAMR) in accordance with various embodiments.

FIG. 2 shows a recording head arrangement 200 in accordance with various embodiments. More particularly, the recording head arrangement 200 is configured as a HAMR device. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211.

FIG. 2 further shows a thermal sensor 212 situated at various locations on the slider 202 at or near the ABS 215. In general, one or more thermal sensors 212 can be situated at locations of the slider 202 where a protrusion of the ABS 214 is to be measured. In some embodiments, a thermal sensor 212a can be situated adjacent the NFT 210 (e.g., between the NFT 210 and the write pole of the writer 206). In some embodiments, the thermal sensor 212a can be located between about 2 and 5 µm from the NFT 210 (or the laser focus location), such as between about 2 and 3 µm. In other embodiments, the thermal sensor 212a can be located as much as about 10 µm from the NFT 210 or the laser focus location.

In other embodiments, a thermal sensor 212b can be situated adjacent the write pole of the writer 206 on the side opposite that nearest the NFT 210. In further embodiments, a thermal sensor 212c can be situated adjacent the waveguide 222 on the side opposite that nearest the NFT 210. Yet in other embodiments, a thermal sensor 212d can be situated adjacent the reader 204. It is understood that a single or multiple thermal sensors 212 may be provided/distributed on the slider 202. The thermal sensor 212 can have a width of between about 0.5 and 10 µm, such as about 1.5 µm. It is further understood that the thermal sensors can be implemented in a variety of technologies, such as resistance thermal sensors, thermistors, and thermocouples, for example. Certain embodiments disclosed herein are directed to sensors having a temperature coefficient of resistance (referred to herein as TCR sensors), it being understood that other forms and/or means of sensing temperature are considered as being within the metes and bounds of the instant disclosure. In some embodiments, existing components of the slider 202 can be used as a thermal sensor. The reader 204 or NFT 210, for example, can be used as thermal sensors rather than or in addition to one or more dedicated thermal sensors.

Some of the TCR sensors described herein are referred to as Dual-ended Thermal Coefficient of Resistance (DETCR) sensors. A DETCR sensor is configured to operate with each of its two electrical contacts (i.e., ends) connected to respective bias sources provided by a pair of electrical bond pads of the slider 202. Another example of a TCR sensor is a ground-split (GS) temperature coefficient of resistance sensor, in which one end of the GSTCR is coupled to ground and the other is coupled to a bias source via an electrical bond pad of the slider 202.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hotspot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hotspot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hotspot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 as data is being recorded.

As was previously discussed, laser light produced by the laser 220 is coupled to the NFT 210 via the waveguide 222. The NFT 210, in response to the incident laser light, generates a high power density in a near-field region that is directed to the magnetic storage medium 211. This high power density in a near-field region of the NFT 210 causes an increase in local temperature of the medium 211, thereby reducing the coercivity of the magnetic material for writing or erasing information to/at the local region of the medium 211. A portion of the laser light energy communicated to the NFT 210 is absorbed and converted to heat within the slider 215. This heating results in thermal expansion of the ABS materials, protrusion at the ABS 215, and a change in both head-media clearance and head-media separation. In addition to the NFT 210, the slider 202 typically includes additional heat sources that can cause further thermal expansion and protrusion of the ABS 215. Such additional heat sources, when active, include one or more of the writer 206 (writer coil), writer heater 207, and reader heater 204.

Figure 3:
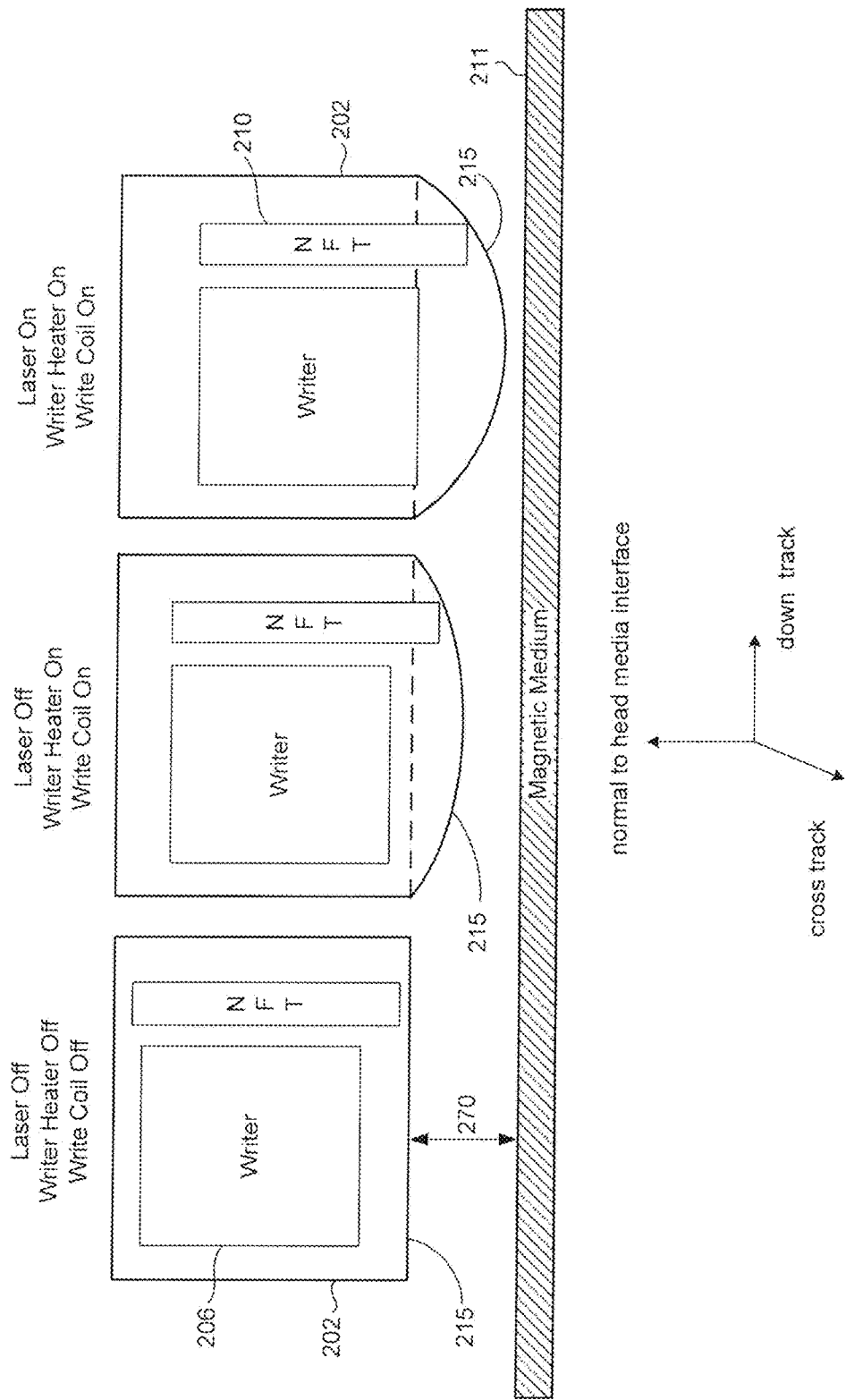
FIGS. 3A-3C are simplified side views of a writer portion of the slider illustrated in FIGS. 1 and 2.

FIGS. 3A-3C are simplified side views of a writer portion of the slider 202 illustrated in FIGS. 1 and 2. FIGS. 3A-3C show general protrusion progression of a portion of the slider ABS 215 in response to activation of different heat sources within the slider 202. These different heat sources include the write coil of the writer 206, the writer heater 207 (not shown for simplicity), and the laser 220 (not shown for simplicity) which produces the optical energy converted to heat by the NFT 210.

In FIG. 3A, the slider 202 is shown in a non-thermally actuated state. In this state, the laser 220, writer heater 207, and writer coil 206 are all off. Thus, the slider 202 attains a default, non-actuated shape/state establishing a default distance between the ABS 215 of the slider 202 and the surface of the magnetic storage medium 211. This default distance is illustrated by an air gap 270.

FIG. 3B illustrates the slider 202 in a partial-thermally actuated state, which is not a typical operational state but is shown for illustrative purposes. In this state, the writer heater 207 and the writer coil 206 are on, but the laser 220 is off. In response to activation of the writer heat sources (write pole, return pole) and writer heater 207, the ABS 215 at and surrounding the writer portion of the slider 202 protrudes into the air gap 270. Thus, the air gap 270 and the distance between ABS 215 and the medium surface 211 decreases. The dashed line in FIG. 3B indicates the default state/shape of ABS 215 depicted in FIG. 3A.

The magnitude of ABS protrusion of the slider 202 is furthered increased by the additional activation of the laser 220, as shown in FIG. 3C. The additional heat produced by the NFT 210 in response to the incident laser light further expands the ABS 215, causing the ABS 215 to protrude further into air gap 270. It can be seen in FIGS. 3A-3C that the stroke, or magnitude, of the air bearing surface protrusion along the cross track direction (z-axis) of the slider 202 changes in size and shape with introduction and removal of heat to/from the ABS 215.

Figure 4:
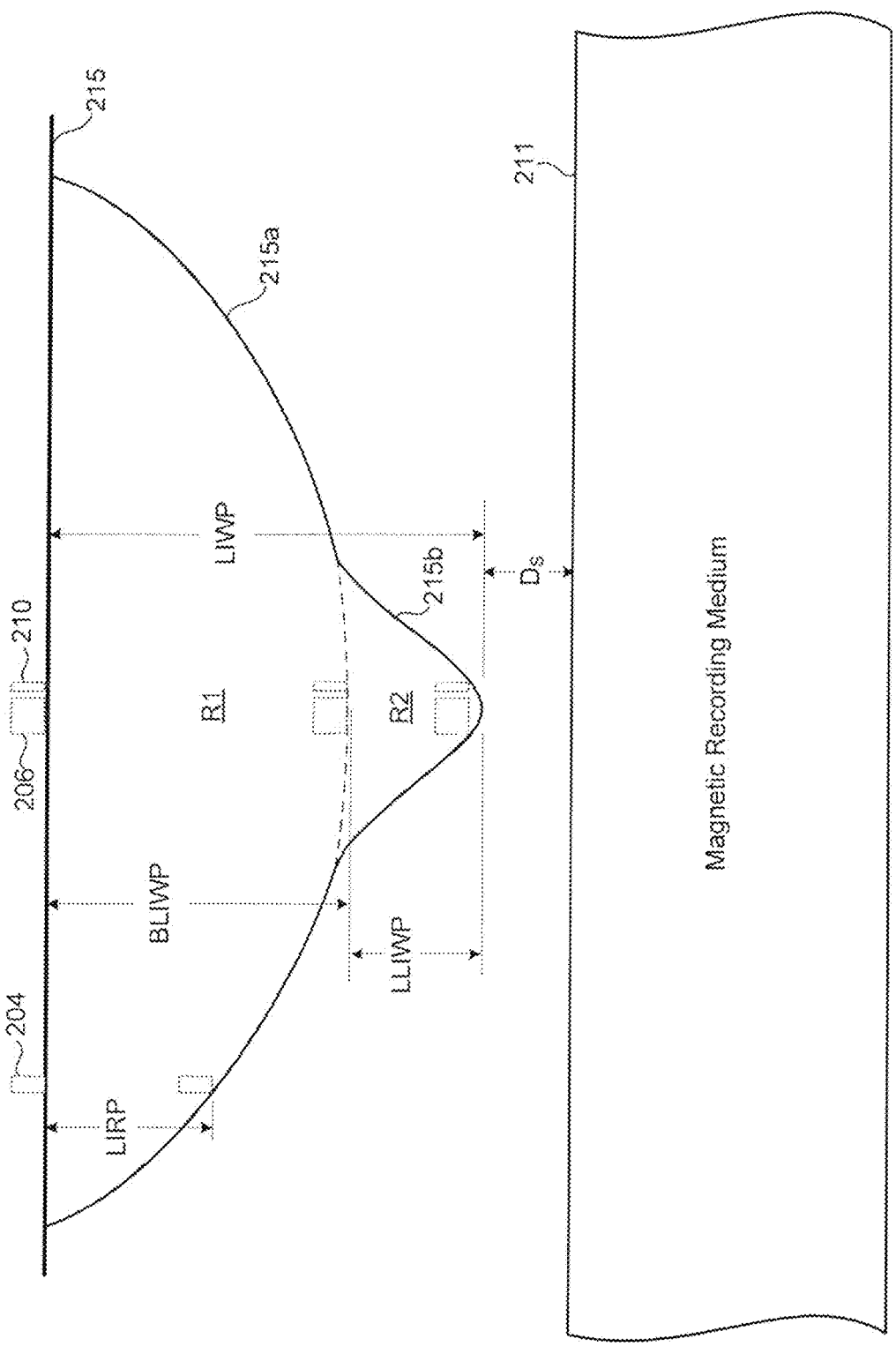
FIG. 4 is an exaggerated illustration of a laser-induced protrusion developed at an air bearing surface (ABS) of a HAMR slider in accordance with various embodiments.

FIG. 4 is an exaggerated illustration of a laser-induced protrusion developed at the ABS 215 of a HAMR slider 200 in accordance with various embodiments. More particularly, the protrusion of the slider ABS 215 shown in FIG. 4 is referred to herein as Laser-induced Writer Protrusion (LIWP). As a shown in FIG. 4, the region of LIWP encompasses a writer 206 and an NFT 210 of the slider. LIWP represents the full excursion of the protrusion developed at the ABS 215 due to heating of the NFT 210 by excitation of the laser and other heat sources (e.g., the writer 206 and writer heater 207). The reader 204 is also subject to displacement by the ABS protrusion resulting from excitation of the laser of the slider. Protrusion of the slider ABS 215 due to laser/NFT heating in the region that encompasses the reader 204 is referred to herein as Laser-induced Reader Protrusion (LIRP). Because the reader 204 is situated away from the NFT 210/writer 206, allowing for dissipation of laser-induced heat, LIRP is not as pronounced as LIWP. However, LIRP is quite noticeable and impacts reader performance. It is noted that the features shown in FIG. 4 are not drawn to scale.

LIWP is understood to include two protrusion components. The first component of LIWP is a broad protrusion component, referred to herein as Broad Laser-induced Writer Protrusion (BLIWP). As the term implies, a relatively broad region of the ABS 215 surrounding the writer 206 and NFT 210 expands to form a protruded region (volume) R1 215a in response to the heat generated by the NFT 210 and the writer 206 (and writer heater 207). The second component of LIWP is a local protrusion component, referred to herein as Local Laser-induced Writer Protrusion (LLIWP). LLIWP is a small and narrow protrusion (relative to the BLIWP) that extends from the BLIWP in a direction towards the surface of the magnetic recording medium 211. As can be seen in FIG. 4, the BLIWP component encompasses a significantly larger volume (in region R1 215a) of ABS material relative to that (in region R2 215b) of the LLIWP component. Evaluation of experimental sliders has revealed that LIWP typically ranges between about 2 and 4 nm, while LLIWP typically ranges between about 1 to 2 nm (<2 nm). It is understood that, although each of LIWP, BLIWP, LLIWP, and LIRP involves expansion of a volume of ABS material, these protrusion parameters are measured in terms of a distance (in nanometers) extending from the ABS 215 and along a plane normal to the ABS 215 in a direction towards the recording medium 211.

As was discussed previously, excitation of the laser causes optical energy to impinge on the NFT 210, causing significant heating at the ABS 215 in the region of the NFT 210. The heat produced by the NFT 210 and the writer 206 (and other thermal sources, such as the writer heater, reader, and reader heater) causes thermal expansion of the surrounding ABS material, resulting in the BLIWP. Heating of the NFT 210 also results in high power density in the local region immediately surrounding the NFT 210, resulting in development of the LLIWP. Although the ABS material in region R1 subject to BLIWP and that of region R2 subject to LLIWP is essentially the same, the thermal time constant of the material in region R1 and region R2 vary significantly from one another. For example, the thermal time constant of the material in region R1 (subject to BLIWP) is between about 100 and 200 µs, which is similar to that of ABS material subject to heating by the writer heater or the reader heater. The thermal time constant of the material in region R2 (subject to LLIWP) is around 1 µs or less.

An important function of a hard disk drive (HDD) is to accurately set the clearance between the slider and the surface of the magnetic storage medium of the HDD. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the medium during operation. It can be appreciated that for HAMR sliders, it is important to account for LIWP in order to avoid detrimental contact between the slider and the medium. Conventional techniques that account for LIWP when setting clearance require that the slider be forced into contact with the recording medium. Such conventional techniques are generally regarded as destructive, in that the slider used for setting clearance is damaged or destroyed during clearance testing. Although clearance settings determined using test sliders can be used for setting clearance of HDD sliders of similar design, conventional clearance setting techniques cannot be used in situ an HDD due to the destructive nature of these techniques.

Embodiments of the present disclosure are directed to techniques for measuring laser-induced protrusions in HAMR sliders that do not require contact between the slider and the surface of the magnetic recording medium. More particularly, embodiments of the disclosure are directed to techniques for measuring a magnitude of at least a portion of a laser-induced protrusion in a HAMR slider while maintaining spacing between the protrusion and the surface of the magnetic recording medium. Embodiments are directed to measuring the magnitude of a broad region of a laser-induced protrusion of a HAMR slider without contacting the recording medium, obtaining an estimate of the magnitude of a local region of laser-induced protrusion that extends from the broad region, and setting slider clearance using the broad region measurement and the local region estimate.

According to some embodiments, changes in the resistance of a thermal sensor of the slider are used to measure one or both of BLIWP and LIRP. The thermal sensor can be used for measuring BLIWP or LIRP during real-time testing, such as during component testing on a spin stand, or in situ an HDD during the lifetime of the product. As is discussed below, the resistance signal produced by the thermal sensor can be measured by several methods including sweeping AC or DC bias of the thermal sensor with the laser on and off, and sweeping one or more heaters to control clearance. The thermal sensor resistance measurement method can be chosen to optimize the signal response for a given slider design. The thermal sensor is preferably located at locations where laser-induced protrusion (e.g., BLIWP or LIRP) measurements are to be made.

Figure 5:
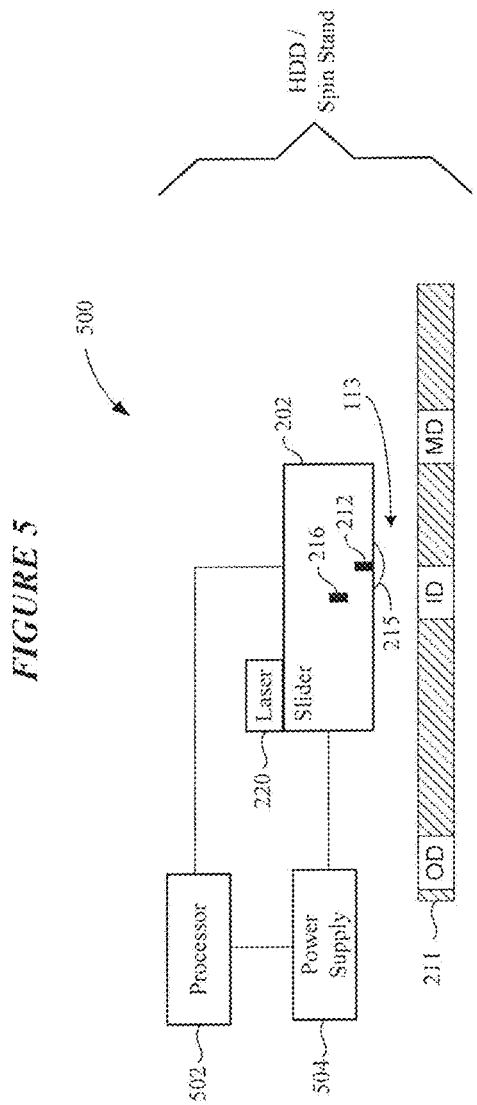
FIG. 5 is a block diagram of an apparatus configured for measuring laser-induced protrusion of a slider ABS using a non-contact-based technique in accordance with various embodiments

FIG. 5 is a block diagram of an apparatus configured for measuring laser-induced protrusion of a slider ABS using a non-contact-based technique in accordance with various embodiments. The apparatus 500 shown in FIG. 5 can be implemented in an HDD or in a spin stand tester, for example. A slider 202 of the apparatus 500 includes a thermal sensor 212 situated at a location at which laser protrusion of the ABS 215 is to be evaluated. The sensor 212 can, for example, be located near the NFT, writer, or reader, or other location at which ABS protrusion is of interest. The slider 202 also includes a heater 216 located in the area in which laser protrusion of the ABS 215 is to be evaluated. A laser 220, such as a laser diode, is situated on the slider or proximate the slider 202, and is configured to couple light to an NFT (not shown) of the slider 202 via an optical waveguide. A power supply 504 is coupled to the slider 202 and is configured to bias the heater 216 and bias the thermal sensor 212. It can be appreciated that the power supply 504 includes multiple power supplies for individually controlling bias power supplied to the heater 216 and the thermal sensor 212. A processor 502 is coupled to the slider 202 and is configured to coordinate non-contact-based measuring of laser-induced protrusion of the ABS 215 in accordance with various embodiments.

A clearance setting procedure according to various embodiments involves providing relative movement between the slider 202 and a magnetic recording medium 211. The processor 502 cooperates with the power supply 504 to measure a resistance of the thermal sensor 212 at various clearance settings with and without exciting the laser 220. A dependence of zero bias resistance, $R_0$, on clearance is calculated by the processor 502 at each clearance setting. The processor 202 uses the resistance data acquired from the thermal sensor 212 to measure a magnitude of at least a portion of the ABS protrusion 215. Importantly, the resistance measurements used to measure laser-induced ABS protrusion are acquired while maintaining spacing between the ABS protrusion 215 and the thermal sensor 212. The non-contact-based protrusion measurement procedure can be repeated at various locations across the diameter of the medium 211, such as one or more outer diameter (OD) locations, one or more inner diameter (ID) locations, and one or more middle diameter (MD) locations.

Figure 6:
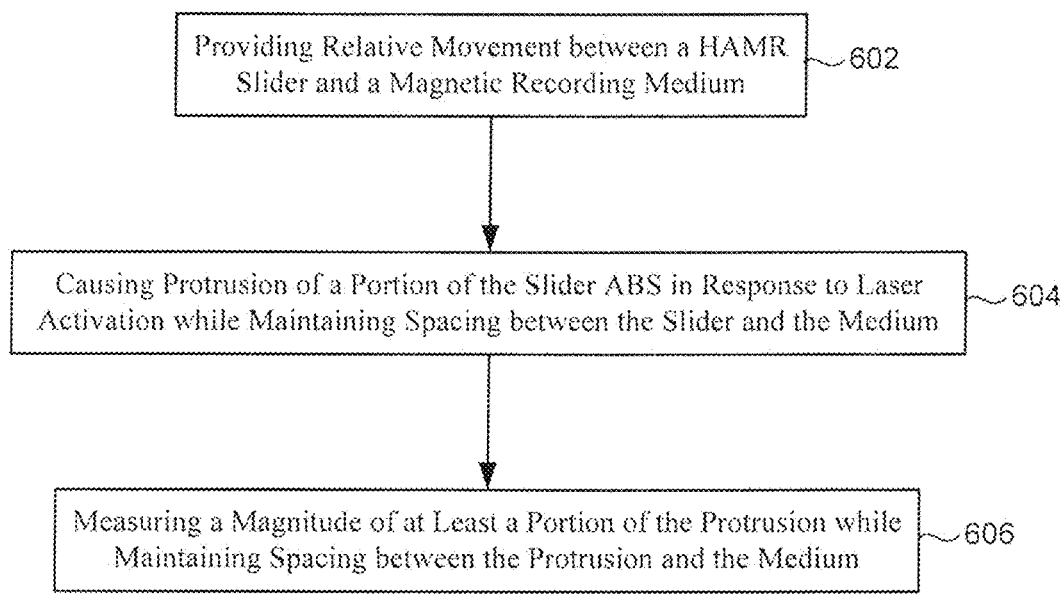
FIG. 6 is a flow diagram of a non-contact-based laser-induced protrusion measurement in accordance with an embodiment of the disclosure.

The apparatus shown in FIG. 5 (and in FIGS. 1 and 2) can be used to implement non-contact-based protrusion measurements in accordance with various embodiments. By way of example, and with reference to FIG. 6, there is illustrated a flow diagram of a non-contact-based laser-induced protrusion measurement in accordance with an embodiment of the disclosure. The method shown in FIG. 6 involves providing 602 relative movement between a HAMR slider and a magnetic recording medium. The method also involves causing 604 protrusion of a portion of the slider ABS in response to laser activation while maintaining spacing between the slider and the medium. The method further involves measuring 606 a magnitude of at least a portion of the protrusion while maintaining spacing between the protrusion and the medium.

Figure 7:
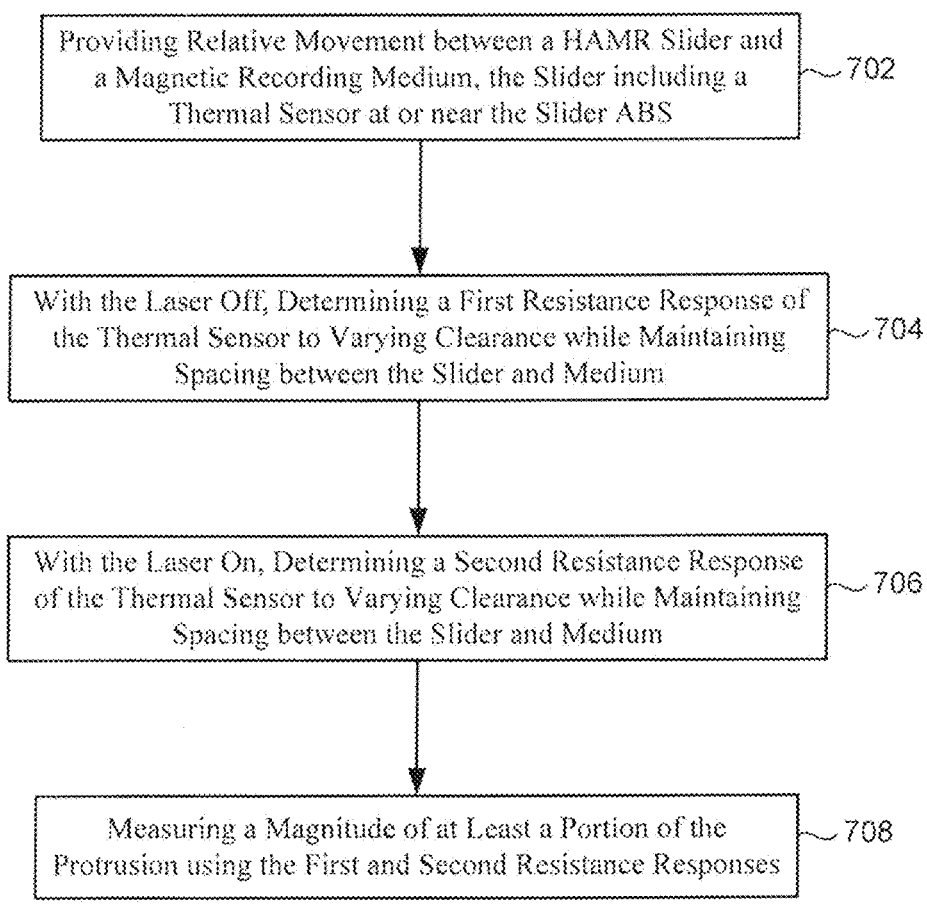
FIG. 7 is a flow diagram of a non-contact-based laser-induced protrusion measurement in accordance with some embodiments.

FIG. 7 illustrates a non-contact-based laser-induced protrusion measurement technique that can be implemented by the apparatus shown in FIGS. 1, 2, and 5 in accordance with various embodiments. The method shown in FIG. 7 involves providing 702 relative movement between a HAMR slider and a magnetic recording medium. The slider includes a thermal sensor at or near the slider ABS in the area in which laser-induced protrusion is to be evaluated. With the laser off, the method involves determining 704 a first resistance response of the thermal sensor to varying clearance while maintaining spacing between the slider and the medium. With the laser on, the method involves determining 706 a second resistance response of the thermal sensor to varying clearance while maintaining spacing between the slider and the medium. The method also involves measuring 708 a magnitude of at least a portion of the protrusion using the first and second resistance responses.

Figure 8:
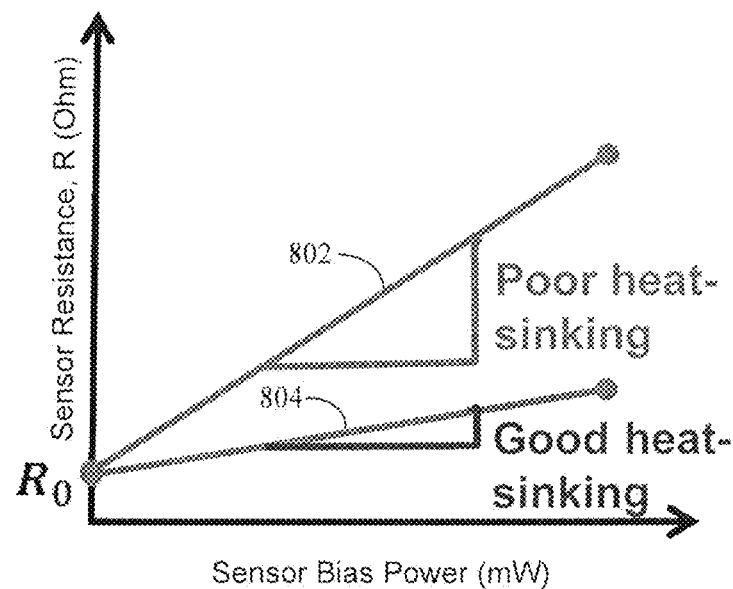
FIG. 8 illustrates a heat sinking phenomenon at a head-disk interface involving a thermal sensor and a magnetic recording medium in accordance with various embodiments.

FIG. 8 illustrates a heat sinking phenomenon within a head-disk interface, such as occurs between a thermal sensor of a slider and a magnetic recording medium. It is assumed that the slider and the thermal sensor are hotter than the recording medium due to heating by the NFT and writer (and other heat sources) and due to biasing of the thermal sensor. As such, the relatively cool recording medium acts as a heat sink. At larger clearances, heat sinking between the thermal sensor and the recording medium is relatively poor. At smaller clearances, heat sinking between the thermal sensor and the recording medium is relatively good.

FIG. 8 shows two plots 802 and 804 of thermal sensor resistance, R (Ohm) as a function of sensor bias power (mW). Plot 802 represents a scenario in which the thermal sensor is relatively far away from the recording medium (i.e., large clearance), resulting in relatively poor heat sinking between the thermal sensor and the medium. Plot 804, in contrast, represents a scenario in which the thermal sensor is relatively close to the recording medium (i.e., small clearance), resulting in relatively good heat sinking between the thermal sensor and the medium. As can be seen in FIG. 8, plots 802 and 804 have different slopes. The slopes of the plots 802 and 804 represent bias sensitivity of the thermal sensor with different materials between the thermal sensor and the medium. As can be seen in FIG. 8, each of the two plots 802 and 804 originate at a common point on the y-axis, designated $R_0$. $R_0$ represents the value of sensor resistance, R, at zero bias power, which is an extrapolated value. It is noted that the value of sensor resistance, R, is given by the equation $R=R_0+sP_B$, where $R_0$ is sensor resistance at zero bias power, s is bias sensitivity (slope), and $P_B$ is bias power.

Figure 9:
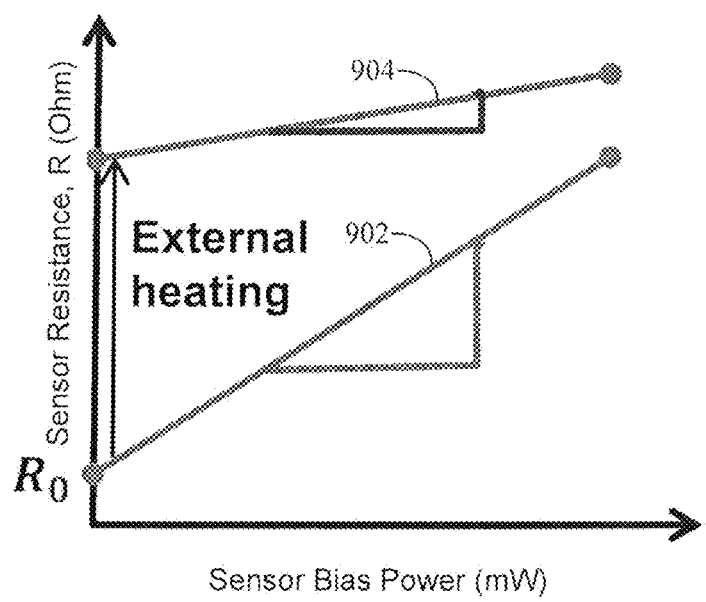
FIG. 9 illustrates a scenario similar to that depicted in FIG. 8, and additionally shows a change in a zero-bias thermal sensor resistance, $R_0$, due to changes in external heating due to varying slider clearance in accordance with various embodiments.

FIG. 9 illustrates a scenario similar to that depicted in FIG. 8, with plot 902 indicating relatively poor heat sinking and plot 904 indicating relatively good heat sinking between the thermal sensor and the recording medium. FIG. 9 differs from that of FIG. 8 in that the resistance $R_0$ is different for each of the two plots 902 and 904. More particularly, the value of $R_0$ for plot 904 is translated upwards on the y-axis relative to $R_0$ for plot 902. This translation or difference in the value of $R_0$ for the two plots 902 and 904 results from differences in external heating or condition of the thermal sensor. An appreciable difference between the value of $R_0$ in the two plots 902 and 904 indicates that the thermal environment of the thermal sensor has changed due to changes in slider fly height. This change in the value of $R_0$ due to a change in slider clearance is used as part of a non-contact laser-induced protrusion measurement according to various embodiments.

Figure 10:
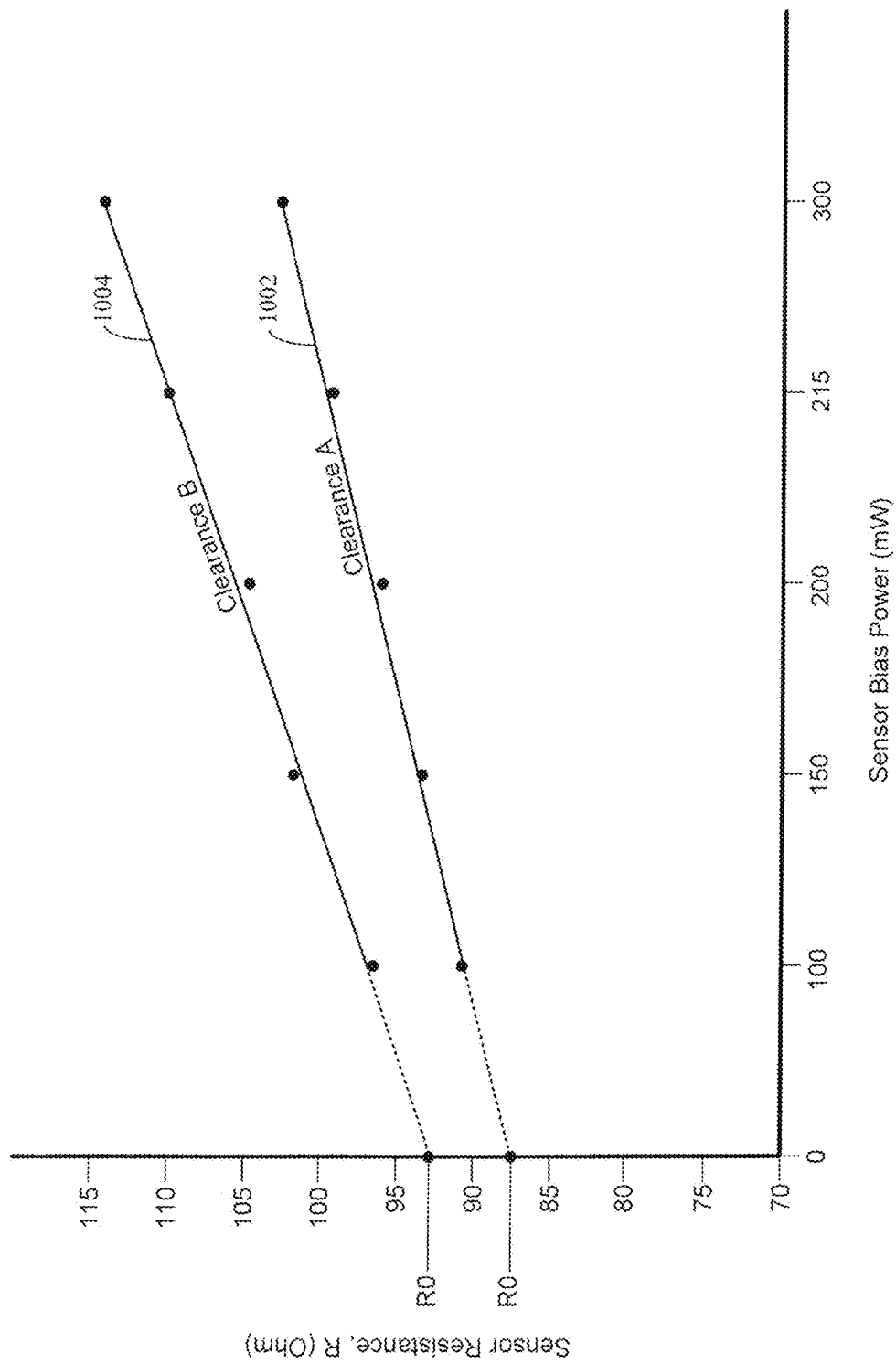
FIG. 10 illustrates how the value of a zero-bias sensor resistance, $R_0$, can be calculated for a thermal sensor in accordance with various embodiments.

FIG. 10 illustrates how the value of $R_0$ can be calculated for a thermal sensor in accordance with various embodiments. FIG. 10 illustrates two plots 1002 and 1004 developed from resistance, R, measurements for the same thermal sensor at two difference clearances A and B. It is understood that plots for more than two clearance settings (e.g., 3-5 clearance settings) can be developed, and that the two plots shown in FIG. 10 are for simplicity of explanation. Plots 1002 and 1004 can be obtained by sweeping the bias power (AC or DC) between a low value (e.g., 0 mW) and a high-value (e.g., 350 mW). As the sensor bias power is swept, the sensor resistance, R, is measured at various power levels. This procedure is repeated with the laser off and with the laser on.

Figure 11:
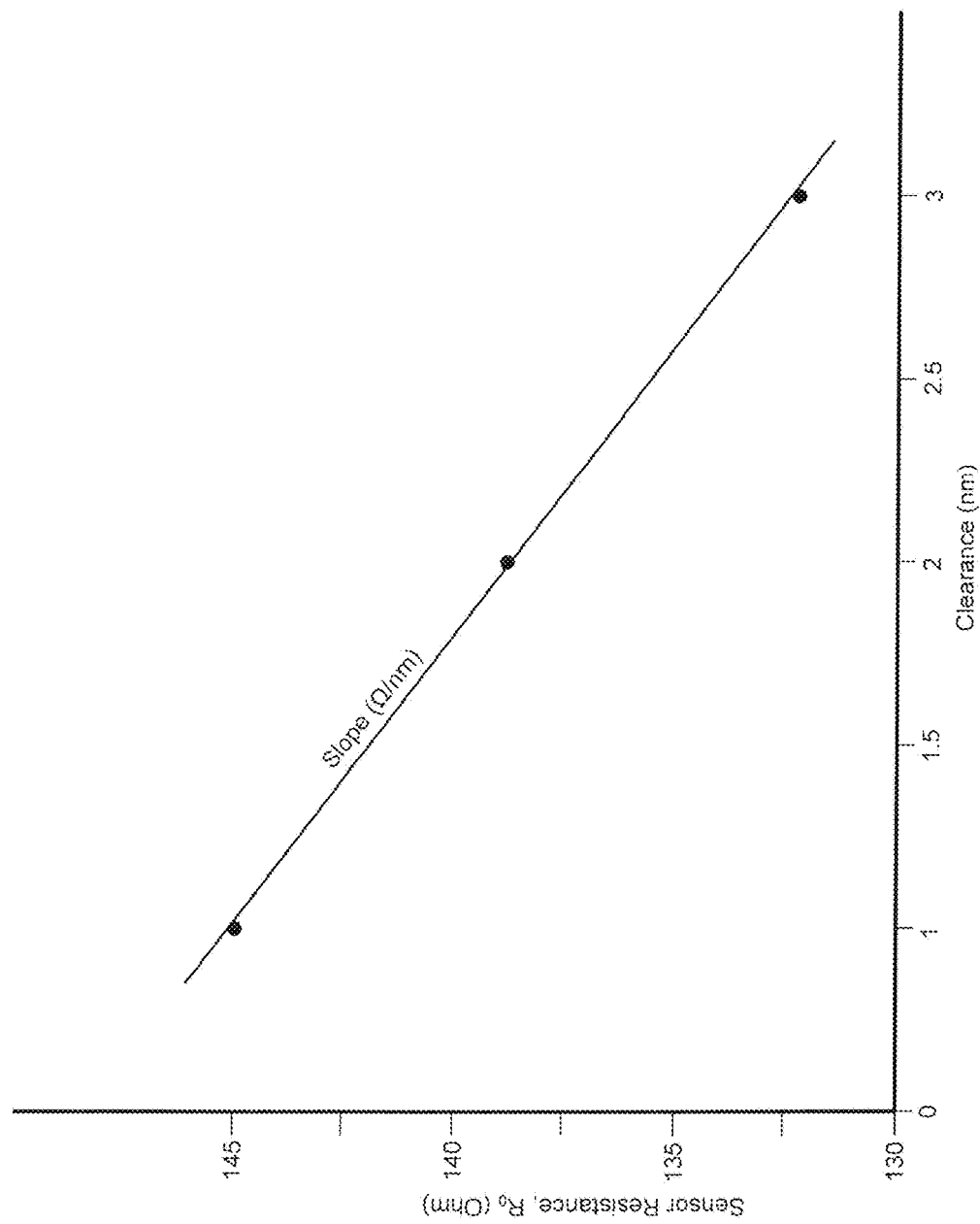
FIG. 11 shows a representative $R_0$ clearance slope ($\Omega$/nm) derived from experimental $R_0$ data acquired with a laser off condition in accordance with various embodiments.

In the example shown in FIG. 10, resistance measurements are taken at 50 mW intervals. A linear fit of the data is performed to calculate the bias sensitivity, s, represented by the slope of each of the two plots 1002 and 1004. Using the linear fit of resistance measurements for each plot 1002 and 1004, the value of $R_0$ is extrapolated for a condition of zero bias power (with the laser off and with the laser on). The value of $R_0$ at each clearance setting can be stored for future reference. The value of $R_0$ for clearance A is smaller than that for clearance B, indicating that clearance B is larger than clearance A. After the value of $R_0$ at each clearance setting has been determined, an $R_0$ clearance slope is determined using the values of $R_0$ obtained with the laser off, as is illustrated in FIG. 11. FIG. 11 shows a representative $R_0$ clearance slope (Ω/nm) derived from experimental $R_0$ data acquired with the laser off.

Figure 12:
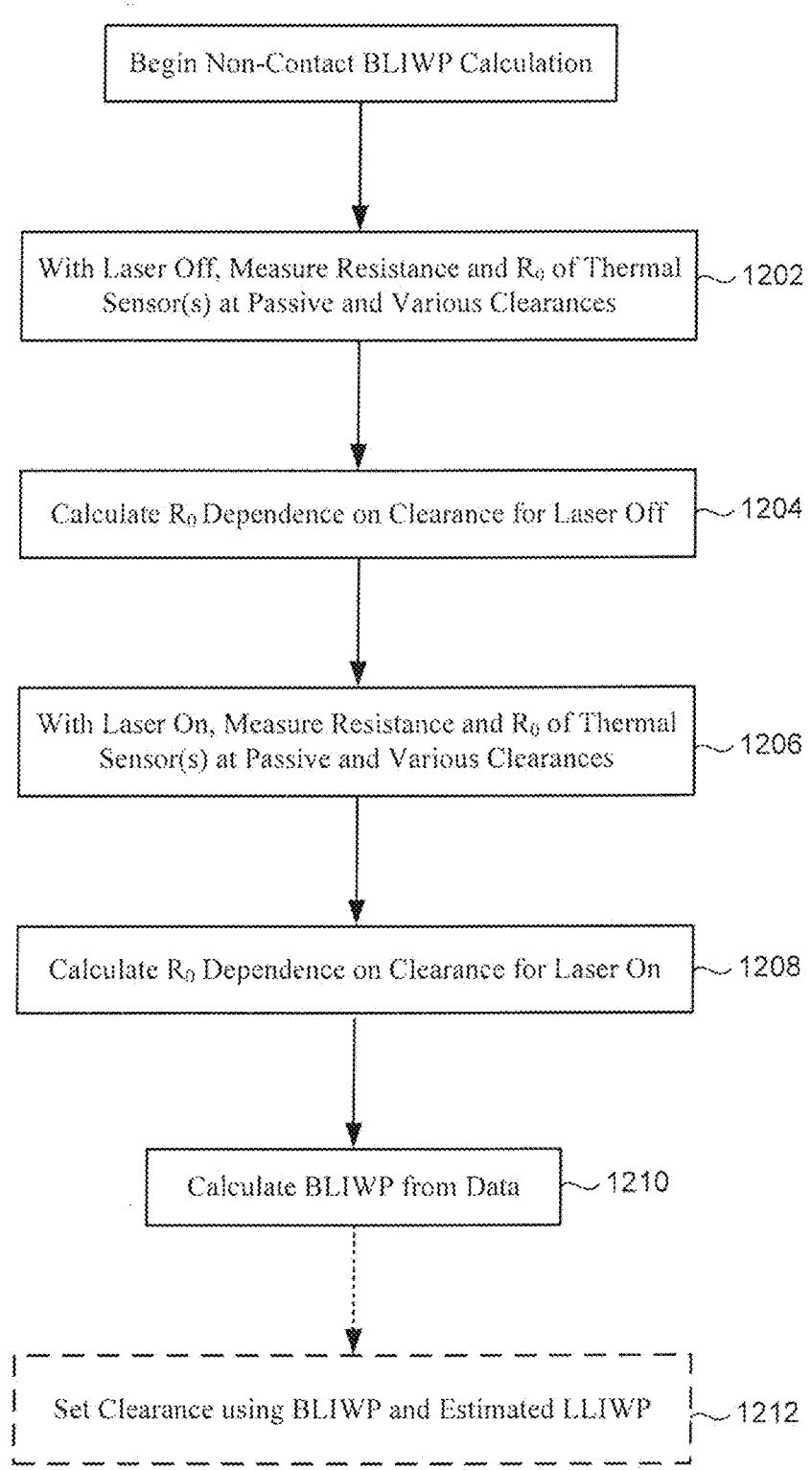
FIG. 12 illustrates a non-contact-based laser-induced protrusion measurement technique in accordance with various embodiments.

FIG. 12 illustrates a non-contact-based laser-induced protrusion measurement technique which can be implemented by the apparatuses shown in FIGS. 1, 2, and 5 in accordance with various embodiments. The method shown in FIG. 12 is directed to calculating the broad component of laser-induced writer protrusion, BLIWP, for a slider ABS in accordance with various embodiments. The non-contact BLIWP calculation method shown in FIG. 12 can begin with the laser off, and involves measuring 1202 the resistance and $R_0$ of one or more thermal sensors at passive and the various clearances. It is understood that a passive clearance represents a clearance achieved by the slider with no power being delivered to the heater situated near the ABS location to be evaluated. The resistance response of the thermal sensor can be measured without the laser on at a passive clearance and at an active 3, 2, and 1 nm clearance by sweeping the DC voltage bias on the thermal sensor within reasonable ranges (e.g., 200 to 600 mV with a dual DETCR implementation). From the thermal sensor response data, $R_0$ can be calculated for each clearance in a manner previously discussed. To reiterate, $R_0$ is the resistance of the thermal sensor with no bias applied.

From the acquired values of $R_0$ at the various clearances, a slope can be calculated to determine 1204 the dependence of thermal sensor resistance with clearance for the laser off condition, such as is shown in FIG. 11. After the $R_0$ clearance slope for the thermal sensor has been measured with the laser off, the above-described process can be repeated 1206, 1208 at a passive, 3, 2, and 1 nm active clearance with the laser on at operating laser current using a conservative fixed LIWP back-off to set active clearance, making sure that the slider never comes into contact with the medium with a laser on. From the laser on and off thermal sensor resistance values determined at steps 1202-1208, BLIWP can be calculated 1210. According to some embodiments, clearance of the slider can be set 1212 using the calculated value of BLIWP and an estimated value of LLIWP. It is noted that an estimate of LLIWP can be obtained empirically or through modeling, and is typically less than about 2 nm.

According to some embodiments, BLIWP can be measured (in nanometers) using the following equation:

$$\text{BLIWP (nm)} = (R_p - R_{p+1}) * \gamma / R_{0slope}$$

where, $R_0$ is the zero bias resistance of the thermal sensor, $R_p$ is the passive resistance of the sensor, $R_{P+1}$ is the passive resistance of the sensor with current supplied to the laser, γ is a laser gamma correction factor based on the location of the thermal sensor, and $R_{0slope}$ is the slope of $R_0$ with the laser off. It is noted that the value of γ typically ranges between 1.0 and 2.5, where 1.0 represents no correction.

Experiments were performed on a number of sliders of equivalent design to measure BLIWP, data from which are presented below in Table 1. For each slider, the passive and active (laser on) values of $R_0$ were measured from which an $R_0$ difference (delta) was computed. The $R_0$ slope for each slider with the laser off was computed. The gamma correction factor was the same for each slider due to the thermal sensor being situated at the same location relative to the NFT/writer for each slider. From these data, BLIWP was calculated. For example, BLIWP for each slider can be calculated by dividing the data of column C by that of D, and multiplying this result by the data of column E.

TABLE 1

| Slider | A Sensor R0 (Ω) Passive | B Sensor R0 (Ω) Laser On | C Sensor ΔR0 (Ω) | D R0 Slope (Ω/nm) Laser Off | E Sensor Gamma (γ) | F BLIWP (nm) | G Contact Based BLIWP (nm) |
|---|---|---|---|---|---|---|---|
| 1 | 173.49 | 180.04 | −6.55 | −5.70 | 2.30 | 2.64 | 2.75 |
| 2 | 174.75 | 180.33 | −5.58 | −5.43 | 2.30 | 2.37 | 2.42 |
| 3 | 172.59 | 179.05 | −6.45 | −5.08 | 2.30 | 2.92 | 2.86 |
| 4 | 175.15 | 182.97 | −7.81 | −5.68 | 2.30 | 3.16 | 2.75 |
| 5 | 174.22 | 182.14 | −7.92 | −5.55 | 2.30 | 3.28 | 2.86 |

The values of BLIWP obtained using a non-contact-based measuring methodology of the present disclosure are in good agreement with a contact-based technique that was laser used on the same sliders (e.g., acoustic emission technique). It is noted that the experimental sliders were damaged or destroyed after completing the contact-based technique used to corroborate the experimental results.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. A method, comprising:
providing relative movement between a magnetic recording medium and a slider configured for heat-assisted magnetic recording, the slider comprising an air bearing surface (ABS) and a thermal sensor at or near the ABS;
causing protrusion of a portion of the ABS of the slider in response to activating at least a laser source while maintaining spacing between the protrusion and the medium;
in the absence of laser excitation, determining a first resistance response of the thermal sensor to varying bias at two or more clearances while maintaining spacing between the slider and the medium;
in the presence of laser excitation, determining a second resistance response of the thermal sensor to varying bias power at the two or more clearances while maintaining spacing between the slider and the medium;
extrapolating a resistance response of the thermal sensor with no bias power, $R_0$, using one or both of the first resistance response and the second resistance response; and
determining a magnitude of at least a portion of the protrusion using $R_0$.

2. The method of claim 1, further comprising:
determining an $R_0$ clearance slope using the first resistance response; and
determining the magnitude of at least the portion of the protrusion using the $R_0$ clearance slope.

3. The method of claim 1, wherein:
the protruded portion of the ABS comprises a first region and a second region;
the second region is closer to the medium than the first region; and
determining the magnitude of at least the portion of the protrusion comprises determining the magnitude of the first region.

4. The method of claim 1, wherein:
the protruded portion of the ABS comprises a first region having a first thermal time constant and a second region having a second thermal time constant;
the second region is closer to the medium than the first region; and
determining the magnitude of at least the portion of the protrusion comprises determining the magnitude of the first region.

5. The method of claim 1, wherein the portion of the ABS comprises a writer and a near-field transducer of the slider.

6. The method of claim 1, wherein the portion of the ABS comprises a reader of the slider.

7. The method of claim 1, further comprising determining the magnitude of at least the portion of the protrusion at different diameters or zones of the medium.

8. An apparatus, comprising:
a slider configured for heat-assisted magnetic recording and comprising one or more thermal sensors at or near an air bearing surface (ABS) of the slider, wherein excitation of a laser source causes protrusion of a portion of the ABS extending toward, but spaced apart from, a magnetic recording medium; and
a processor coupled to the one or more thermal sensors and configured to:
in the absence of laser excitation, determine a first resistance response of the thermal sensor to varying bias power at two or more clearances while maintaining spacing between the slider and the medium;
in the presence of laser excitation, determine a second resistance response of the thermal sensor to varying bias power at the two or more clearances while maintaining spacing between the slider and the medium;
extrapolate a resistance response of the thermal sensor with no bias power, $R_0$ using one or both of the first resistance response and the second resistance response; and
determine a magnitude of at least a portion of the protrusion using $R_0$.

9. The apparatus of claim 8, wherein:
the protruded portion of the ABS comprises a first region and a second region;
the second region is closer to the medium than the first region; and
the processor is configured to determine the magnitude of the first region.

10. The apparatus of claim 8, wherein:
the protruded portion of the ABS comprises a first region having a first thermal time constant and a second region having a second thermal time constant;

the second region is closer to the medium than the first region; and the processor is configured to determine the magnitude of the first region.

11. The apparatus of claim 8, wherein:

one of the thermal sensors is situated at each of a plurality of slider locations subject to ABS protrusion in response to excitation of the laser source; and the processor is configured to determine the magnitude of at least a portion of each ABS protrusion using the thermal sensor proximate each ABS protrusion.

12. The apparatus of claim 8, wherein the portion of the ABS comprises a writer and a near-field transducer of the slider.

13. The apparatus of claim 8, wherein the portion of the ABS comprises a reader of the slider.

14. The apparatus of claim 8, wherein the processor is configured to determine the magnitude of at least the portion of the protrusion at different diameters or zones of the medium.

15. A method, comprising:

providing relative movement between a magnetic recording medium and a slider configured for heat-assisted magnetic recording, the slider comprising an air bearing surface (ABS) and a thermal sensor at or near the ABS;

causing protrusion of a portion of the ABS of the slider in response to activating at least a laser source while maintaining spacing between the protrusion and the medium;

calculating a resistance response, $R_0$, as a resistance of the thermal sensor with no bias power supplied to the thermal sensor;

in the absence of laser excitation, determining a first resistance response of the thermal sensor to varying clearance while maintaining spacing between the slider and the medium;

calculating a first value indicative of $R_0$ dependence on clearance based on the first resistance response;

in the presence of laser excitation, determining a second resistance response of the thermal sensor to varying clearance while maintaining spacing between the slider and the medium, wherein the laser excitation causes protrusion of a portion of the ABS;

calculating a second value indicative of $R_0$ dependence on clearance based on the second resistance response; and determining a magnitude of at least a portion of the protrusion using the first value and the second value.

16. The method of claim 15, wherein:

the protruded portion of the ABS comprises a first region and a second region;

the second region is closer to the medium than the first region; and determining the magnitude of at least the portion of the protrusion comprises determining the magnitude of the first region.

17. The method of claim 15, wherein:

the protruded portion of the ABS comprises a first region having a first thermal time constant and a second region having a second thermal time constant;

the second region is closer to the medium than the first region; and determining the magnitude of at least the portion of the protrusion comprises determining the magnitude of the first region.

18. The method of claim 15, wherein the portion of the ABS comprises a writer and a near-field transducer of the slider.

19. The method of claim 15, wherein the portion of the ABS comprises a reader of the slider.

20. The method of claim 15, further comprising determining the magnitude of at least the portion of the protrusion at different diameters or zones of the medium.

* * * * *